Patented Apr. 29, 1947

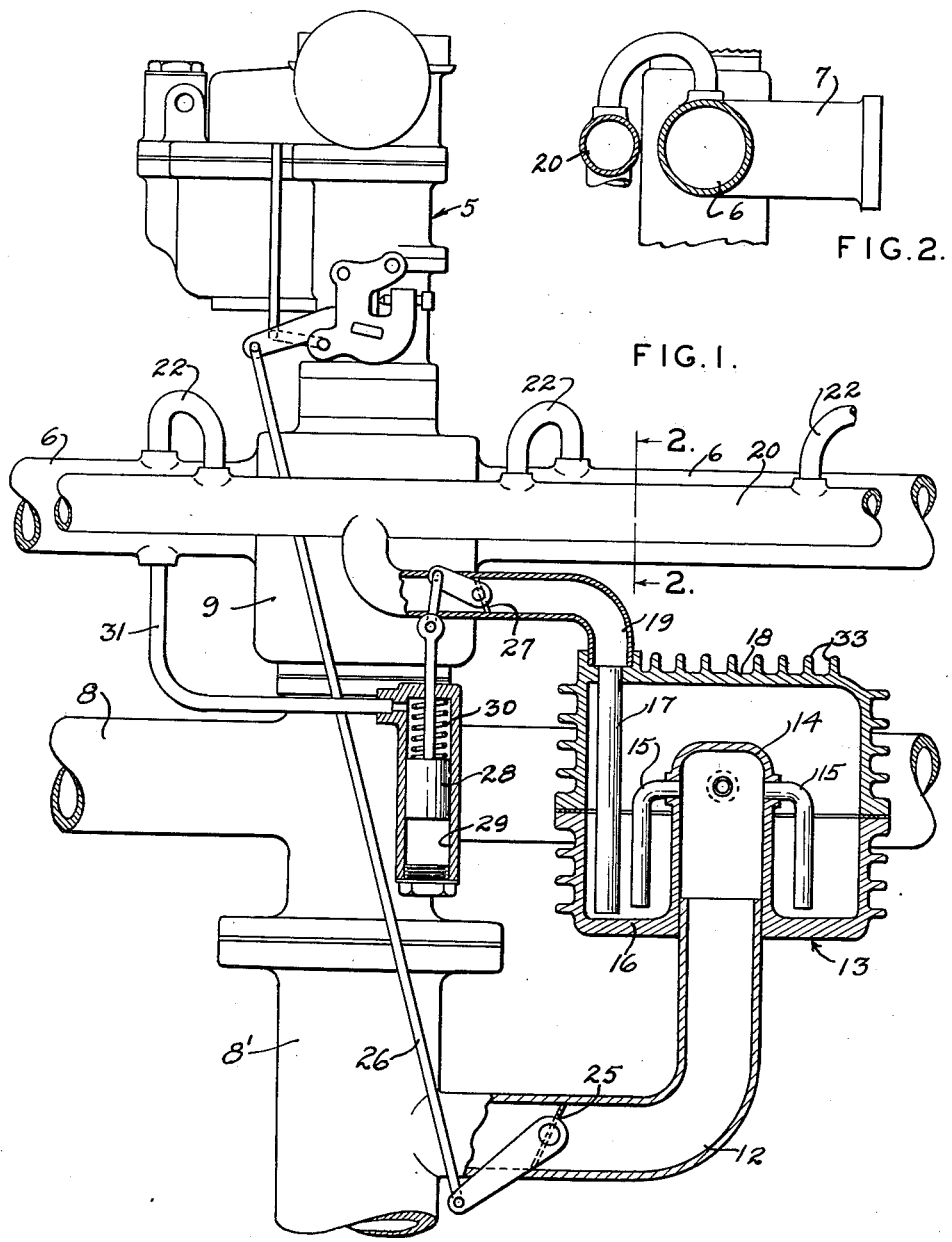

2,419,747

UNITED STATES PATENT OFFICE 2,419,747

CONDITIONER FOR RECIRCULATED EXHAUST GASES

August H. Wassman, St. Louis County, Mo., assignor to Carter Carburetor Corporation, St. Louis, Mo., a corporation of Delaware Application August 24, 1944, Serial No. 551,054

7 Claims. (Cl. 123—119)

This invention relates to exhaust re-circulation devices for internal combustion engines and consists particularly in novel means for conditioning and distributing the exhaust gases to obtain maximum efficiency thereof.

Where exhaust gases are re-circulated through an internal combustion engine, it is desirable that these gases be first cooled, then distributed to the engine intake manifold as closely as possible to the intake port. It is further desirable that provision be made for collecting moisture which condenses in the cooler and then directing the same into the engine in a movement to avoid the possibility that collected moisture may impede the travel of exhaust to the engine, particularly when the exhaust pressure and suction of the engine are low.

An object of the present invention is to provide a novel conditioning device for re-circulated exhaust gases in an internal combustion engine.

Another object is to provide a novel exhaust cooler having means for collecting condensed moisture at a point where such collected moisture will not impede the flow of exhaust gases to the engine.

These objects and other more detailed objects hereafter appearing are attained substantially by the device illustrated in the accompanying drawing in which Fig. 1 is a side view, partly sectioned, illustrating portions of an internal combustion engine having the invention applied thereto.

Fig. 2 is a detail taken on line 2—2 of Fig. 1.

The drawing illustrates a downdraft carburetor 5 attached to the engine intake manifold 6 having a plurality of branches, as at 7, leading to the engine intake ports. Below the intake manifold there is an exhaust manifold 8, the central portion of which there is connected the exhaust pipe 8' which leads to a remote point, such as the rear of an automotive vehicle. A portion of the exhaust gases are circulated through a hot-spot 9 which surrounds the central portion of the intake manifold.

A by-pass pipe 12 extends from exhaust pipe 8 to an exhaust cooler chamber 13 and terminates therein in a dome 14 projecting above the chamber floor. A plurality of angular tubes 15 project laterally and downwardly from the upper portion of dome 14 and open into the chamber at points spaced slightly above the chamber floor 16. Another tube 17 depends from the upper wall 18 of the chamber and, likewise, opens into the chamber at a point spaced slightly above floor 16. Tube 17 is connected by a pipe 19 to a header pipe 20 which extends along intake manifold 6. A plurality of branch connections 22 extend between header 20 and portions of the intake manifold adjacent the engine intake ports, one of which is shown at 7 in Fig. 2.

The flow of gases through the by-pass cooler and header is controlled by a butterfly valve 25 in pipe 12 which is actuated from the throttle valve by means of a link 26 so that valve 25 is opened in direct relation to the opening of the throttle valve. As second butterfly valve 27 is provided in upper exhaust connection 19 and is actuated by a piston 28 which works in a cylinder 29. Piston 28 is urged downwardly, in the direction to open valve 27, by a coiled spring 30. A tube 31, extending from the upper part of chamber 29 to the intake manifold, applies engine suction to piston 28 so as to tend to close valve 27 against spring 30 in accordance with suction conditions in the intake manifold. The arrangement of the control is such that during idling and when the throttle is closed, or nearly closed, no exhaust gases are re-circulated.

At other times, when valves 25 and 27 are open, a portion of the exhaust gases pass through cooler 13 and header 20 to the intake manifold and then into the firing chambers along with the combustible mixture. The cooling effect of chamber 13 is augmented by ribs 33 formed on the outside thereof. The construction of the cooling chamber, and particularly the inlet and outlet connections thereof, is such that moisture condensed in the chamber tends to collect on the chamber floor and is then drawn upwardly through tube 17 for distribution to the engine cylinders. However, at times of particularly low suction in the engine intake manifold, exhaust gases can pass over collected moisture in the chamber and thence into outlet connection 17. Chamber 13 also acts to collect solid matter deposited from the exhaust.

The invention may be modified in various respects as will occur to those skilled in the art and the exclusive use of all modifications as come within the scope of the appended claims is contemplated.

I claim:

1. An exhaust conditioning device comprising a chamber having inlet and outlet connections for exhaust gases, said outlet connection comprising a tube opening in said chamber at a point spaced slightly above the chamber floor.

2. An exhaust conditioning device comprising a chamber having inlet and outlet connections for exhaust gases, said inlet connection comprising a tube depending in said chamber and opening thereunto at a point spaced slightly above the chamber floor.

3. An exhaust conditioning device comprising a chamber having inlet and outlet connections for exhaust gases, said inlet connection comprising a dome extending into said chamber and a tube projecting therefrom and opening into said chamber slightly above the chamber floor.

4. An exhaust conditioning device comprising a chamber having inlet and outlet connections for exhaust gases, said inlet connection comprising a dome extending into said chamber and a plurality of tubes depending from said dome and opening into said chamber at points spaced slightly above the chamber floor.

5. An exhaust conditioning device comprising a ribbed expansion chamber having inlet and outlet connections for exhaust gases, said inlet connection comprising a dome projecting above the chamber floor and a plurality of tubes depending from the upper part of said dome and opening into said chamber at points spaced slightly above the chamber floor.

6. An exhaust conditioning device comprising a ribbed expansion chamber having inlet and outlet connections for exhaust gases, said inlet connection comprising a dome projecting above the chamber floor and a plurality of tubes depending from the upper part of said dome and opening into said chamber at points spaced slightly above the chamber floor, and said outlet connection comprising a tube depending into said chamber and also opening therein at a point slightly spaced above the chamber floor.

7. In combination with an internal combustion engine having an exhaust pipe and an intake manifold, a cooling chamber connected to said exhaust pipe and having exhaust inlet and outlet connections in the form of tubes projecting into said chamber and opening therein at points spaced slightly above the chamber floor, a distributing header extending adjacent the engine intake manifold, and a plurality of branch connections between said header and points along said manifold adjacent the engine intake ports.

AUGUST H. WASSMAN.

REFERENCES CITED

The following references are of record in the file of this patent:

UNITED STATES PATENTS

| Number | Name | Date |
|---|---|---|
| 1,766,674 | Moore | June 24, 1930 |
| 2,317,582 | Bicknell | Apr. 27, 1943 |